Patented Feb. 14, 1950

2,497,310

UNITED STATES PATENT OFFICE 2,497,310

SYNTHESIS OF AMINES

Alfred T. Larson, Wilmington, Del., assignor to E. I. du Pont de Nemours & Company, Wilmington, Del., a corporation of Delaware No Drawing. Application January 3, 1946, Serial No. 638,924

5 Claims. (Cl. 260—585)

This invention relates to the synthesis of nitrogen-containing organic compounds and more particularly to the synthesis of aliphatic primary, secondary and tertiary amines by reaction between organic compounds containing olefinic unsaturation, carbon monoxide, hydrogen, and ammonia or substituted ammonias.

An object of this invention is to provide a method for preparing amines from relatively inexpensive starting materials. Another object is to provide a method for the synthesis of amines from compounds not heretofore known to give rise to the formation of amines. Other objects will appear hereinafter.

It has been discovered, in accordance with the invention, that carbon monoxide, hydrogen and ammonia, or substituted ammonias, react under the conditions hereinafter set forth with organic compounds containing olefinic unsaturation to produce nitrogen-containing organic compounds, particularly amines. In a specific embodiment the synthesis of amines in accordance with the present invention may be illustrated by means of the following equation:

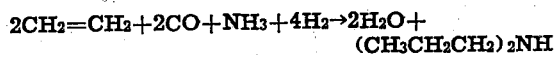
$2CH_2=CH_2 + 2CO + NH_3 + 4H_2 \rightarrow 2H_2O + (CH_3CH_2CH_2)_2NH$ The organic compounds containing olefinic unsaturation which may be used in accordance with this invention are the olefinic hydrocarbons and other organic compounds containing a (i. e., at least one) non-benzenoid double bond between carbon atoms. Suitable examples of such compounds are the olefinic hydrocarbons themselves, such as ethylene, propylene, the butylenes, the pentenes, the hexenes, cyclohexene, cracked petroleum fractions, butadiene, isoprene, polymerized dienes, styrene, alpha-methyl styrene, vinyl cyclohexene, pinene, limonene, cyclohexadiene; unsaturated oxygenated compounds such as allyl alcohol, methallyl alcohol, vinyl acetate, methyl methacrylate, methyl crotonate, methyl vinyl ketone, cyclohexene, carboxylic acid, esters of cyclohexene carboxylic acids, methallyl methacrylate, acrolein; acrylonitrile, vinyl chloride, allyl amine, acrylamide, etc.; and, in general, the unsaturated hydrocarbons, esters, ethers, carboxylic acids, nitriles, amides, amines, aldehydes and ketones containing non-benzenoid olefinic unsaturation.

The compounds which may react with carbon monoxide, hydrogen and organic compounds containing olefinic unsaturation, in accordance with the invention, include ammonia and substituted ammonias, (e. g., monoamines, diamines, polyamines, etc., whether saturated or unsaturated), such amines having at least one hydrogen attached to amino nitrogen. In specific embodiments, these reactants are compounds of the formula $NHR_2$ in which R represents hydrogen or an organic radical. It is not essential that both groups represented by R be similar. In the simplest embodiments of the invention, R is a member of the class consisting of hydrogen and alkyl groups. However, R may be alkenyl, cycloalkenyl, aryl, aralkyl, cycloalkyl, etc., or derivatives thereof containing substituent groups, such as hydroxyl, amino, alkoxy, or the like.

The reaction between the unsaturated compound, carbon monoxide, hydrogen and ammonia, or substituted ammonia, according to the invention, is conducted in the presence of a catalyst at elevated temperatures, preferably about 50° to 350° C., or higher. It is generally desirable to employ superatmospheric pressures, preferably above about 50 atmospheres. The maximum pressure is determined by the strength of available equipment and may be as high as 2000 to 3000 atmospheres or even higher. Optimum results are obtained at a temperature of about 160° to 260° C. under a reaction pressure of about 100 to 2000 atmospheres. In general, pressure and temperature and inversely interdependent variables. In most instances, the catalysts employed are catalysts which are known to be effective in other hydrogenation reactions, such as cobalt, nickel, ruthenium, iron, and copper, their compounds and alloys, or combinations of the same, which catalysts may be used on inert supports, or in combination with conventional promoters if desired. The catalysts which are operative in the present invention include also the salts of these metals. Copper-containing substances are among the most active catalysts for the purposes of the present invention. A preferred catalyst is cobalt carbonyl, which may be used in any desired quantity, but which gives excellent results when present to the extent of only a few tenths of a per cent, based on the total weight of the reaction mixture. Other suitable catalysts are metallic cobalt, metallic nickel, fused copper-silica, cobalt chromite, cobalt-substituted amines, cobalt salts of organic carboxylic acids, and cobalt compounds in general, especially those which are soluble in the reaction mixture. When metal carbonyls, such as nickel or cobalt carbonyl are used as the catalyst, it is preferable to employ an inert solvent therefor, such as benzene, cyclohexane, saturated aliphatic esters, alkanes, ethers or the like. When cobalt itself, or organic compounds thereof, are employed as catalysts, the reaction mixture generally yields, upon distillation, a heel containing chemically combined cobalt in a form which is itself a very satisfactory catalyst for the reaction, and hence can be recycled and re-used repeatedly with make-up amounts of the reactants.

The reaction is preferably conducted by heating a mixture of approximately equimolar quantities of the unsaturated compound and ammonia, or substituted ammonia, under a high pressure of hydrogen and carbon monoxide in a suitable pressure-resistant vessel in the presence of one of the aforesaid catalysts. Moreover, the preparation of primary, secondary and tertiary ammonia may be varied by changing the mol ratio of the reactants.

The process of the invention may be conducted in either the liquid phase or in the vapor phase. The resulting product is thereafter removed from the reaction vessel, and the nitrogen-containing compounds produced by the reaction are separated by any suitable method, such as by fractional distillation.

The invention is illustrated further by means of the following examples:

*Example 1.*—A mixture containing 75 c. c. of diethyl ether, 17 grams of ammonia, 20 grams of reduced fused cobalt catalyst and 28 grams of ethylene was heated for 1.5 hours at a temperature of 170° to 262° C. under 470 to 755 atmospheres pressure of a gas having the composition, $4H_2:1CO$, (molal proportions). Distillation of the resulting product gave a mixture of n-propyl amines in which the di-n-propyl amine predominated. These amines were separated from the reaction mixture as an aqueous azeotrope by fractional distillation. The upper layer of the azeotrope analyzed 40.7% di-n-propyl amines.

When the foregoing experiment was repeated using an activated nickel-aluminum alloy catalyst in place of the cobalt catalyst, the reaction set in violently at 160° C. and the temperature went to 270° C. Conversion to crude propyl amines was about 3%.

*Example 2.*—A charge consisting of 14.0 grams of ethylene (0.5 mol), 17.0 grams ammonia (1.0 mol), 64 c. c. cyclohexane and 10 grams of reduced copper oxide catalyst was heated in a silver lined shaker tube for 1 hour at 246° to 250° C., under a pressure of 560 to 850 atmospheres of a gas having the composition $CO:2H_2$ (initial molal proportions). Distillation of the resulting mixture gave recovered diluent containing some ammonia and propyl amine, and a residue, which on continued distillation gave 13.1 grams of impure di-n-propyl amine, B. P. 108° to 125° C. (identified as picrate), and 4.2 grams of a high boiling fraction (B. P. 61° C. at 29 mm. to 80° C. at 3 mm.), which was a mixture of propionamide and 2-ethyl-3,5-dimethylpyridine.

*Example 3.*—Two charges (each containing 45.1 grams dimethyl amine, 21.0 grams propylene, 70 c. c. diethyl ether (as diluent), 5 grams reduced sintered cobalt oxide (as catalyst) and 5 grams reduced sintered copper oxide (as catalyst)) were heated for 30 minutes at 180° to 190° C., and thereafter for 20 minutes at 235° to 245° C., under 440 to 850 atmospheres of $CO:2H_2$ (initial molal proportions). As the reaction progressed, the temperature flashed to 270° C. The combined products consisted of 195.3 grams brown upper layer and 18.0 grams dark brown lower layer. Distillation of the upper layer plus an ether extract of the lower layer gave 75.9 grams boiling up to 119° C. (containing 18 c. c. of lower layer), and 41.8 grams boiling from 44° C. at 48 mm. to 121° C. at 4 mm. (containing N,N-dimethyl butyramide and nitrogen derivatives of propylene dimers and polymers). Redistillation of the upper layer of the cut boiling up to 119° C. gave 47.7 grams dimethyl n-propylamine, (B. P. 78° to 97° C., mostly 90° to 95° C.; refractive index=1.3960 at 250, D-line; neutral equivalent=103.0 (theory=101.12); %N, found=14.11 (calculated, 13.82%)).

The invention may be practiced by heating the reactants in any suitable pressure-resistant reaction vessel, such as an autoclave, or tubular converter, preferably made of, or lined with, inert materials such as glass, porcelain, inert metals and the like. Outstanding results are obtained in reaction vessels lined with silver or copper. If desired, materials of construction yielding small amounts of cobalt carbonyl may be employed. The process may be conducted batchwise or continuously. In the continuous process, the reactants may be introduced at one or more points within the reaction vessel if desired. In certain instances it is preferred to employ a tubular reaction vessel in which the temperature and pressure are not uniform throughout the length of the vessel. Any suitable inert reaction medium may be employed, whether or not the reactants are soluble therein, but it is preferred to employ a medium in which the reactants are soluble.

Generally, pure carbon monoxide is employed as a reactant according to the invention, but mixtures of gases containing carbon monoxide with hydrogen or inert gases may be utilized if desired, provided the partial pressure of the reactants is sufficient to give rise to the formation of amines.

The amines which are obtained in accordance with this invention are highly valuable per se and are particularly useful for further conversion by known methods to other organic materials such as amides, nitriles, amino acids, lactams, etc.

Since many embodiments of the invention may be made without departing from the spirit and scope thereof, it will be understood that I do not limit myself except as set forth in the following claims.

I claim:

1. A process for the synthesis of amines which consists in introducing carbon monoxide, hydrogen, a compound of the class consisting of ammonia and amines having at least one hydrogen attached to amino nitrogen, an unsaturated hydrocarbon compound containing a non-benzenoid double bond between carbon atoms, and a catalytic quantity of cobalt metal into a pressure resistant vessel, and heating the resulting mixture at a temperature within the range of 50 to 350° C., under a reaction pressure in excess of 50 atmospheres, whereby a reaction product containing amines is produced, and thereafter separating from the said reaction product the amines produced by the said reaction.

2. The process set forth in claim 1 in which the unsaturated compound is ethylene.

3. The process set forth in claim 1 in which the unsaturated compound is propylene.

4. The process set forth in claim 1 in which the said amine reactant is dimethyl amine.

5. A process for the preparation of di-n-propylamine which consists in reacting about 17 parts by weight of ammonia with about 28 parts by weight of ethylene, in an inert solvent, in the presence of metallic cobalt, at a temperature in the range of about 170° to 262° C., under a pressure of about 700 atmospheres of a gas containing 4 moles of hydrogen per mole of carbon monoxide, whereby a reaction product containing di-n-propylamine is produced, and thereafter separating di-n-propylamine from the resulting product.

ALFRED T. LARSON.

REFERENCES CITED

The following references are of record in the file of this patent:

UNITED STATES PATENTS

| Number | Name | Date |
|---|---|---|
| 1,966,478 | Baur | July 17, 1934 |
| 2,327,066 | Roelen | Aug. 17, 1944 |
| 2,422,631 | Olin et al. | June 17, 1947 |
| 2,422,632 | Olin et al. | June 17, 1947 |

OTHER REFERENCES

Mignonac, "New General Methods for Preparing Amines from Aldehydes and Ketones," Chemical Abstracts, 15, 1285.

Smolenski et al., "Preparation of Amines from Alcohol and Ammonia," Chemical Abstracts, 16, 3062.